(12) United States Patent
Myneni et al.

(10) Patent No.: US 12,720,364 B2
(45) Date of Patent: Aug. 25, 2026

(54) COMMUNICATION OF PRIORITIZED DATA

(71) Applicant: Apple Inc., Cupertino, CA (US)

(72) Inventors: Krishna Myneni, Santa Clara, CA (US); Dhruv Khati, San Jose, CA (US); Shiva Krishna Narra, San Jose, CA (US); Sanjeevi Balasubramanian, San Jose, CA (US); Anjaneyulu Maganti, San Jose, CA (US)

(73) Assignee: Apple Inc., Cupertino, CA (US)

( * ) Notice: Subject to any disclaimer, the term of this patent is extended or adjusted under 35 U.S.C. 154(b) by 837 days.

(21) Appl. No.: 17/713,681

(22) Filed: Apr. 5, 2022

(65) Prior Publication Data

US 2023/0081455 A1 Mar. 16, 2023

Related U.S. Application Data

(60) Provisional application No. 63/244,993, filed on Sep. 16, 2021.

(51) Int. Cl.
*H04W 28/08* (2023.01)
*H04W 4/90* (2018.01)
*H04W 72/56* (2023.01)
*H04W 76/50* (2018.01)

(52) U.S. Cl.
CPC ......... *H04W 28/0831* (2020.05); *H04W 4/90* (2018.02); *H04W 28/0846* (2020.05); *H04W 72/56* (2023.01); *H04W 76/50* (2018.02)

(58) Field of Classification Search
None
See application file for complete search history.

(56) References Cited

U.S. PATENT DOCUMENTS 5,448,623 A 9/1995 Wiedeman et al.
5,535,430 A 7/1996 Aoki et al.
7,702,319 B1 * 4/2010 Arslan .................... H04W 4/20 455/414.4
10,110,463 B2 10/2018 Reis
10,268,704 B1 * 4/2019 Sanderson ............ G06F 16/278
2013/0188526 A1 * 7/2013 Cooper, Jr. ......... H04M 7/0069 370/259
2016/0119858 A1 * 4/2016 Liu ................. H04W 36/00837 455/434

(Continued)

FOREIGN PATENT DOCUMENTS

CN 111865821 A 10/2020
WO 2004100501 A2 11/2004
WO WO-2014048344 A1 * 4/2014 .............. H04W 4/02

*Primary Examiner* — Christopher T Wyllie
(74) *Attorney, Agent, or Firm* — FLETCHER YODER PC

(57) ABSTRACT

An electronic device determines that a first network is inaccessible and that non-prioritized services associated with a second network are unavailable. In response, the electronic device communicates non-prioritized data via a third network. Additionally, in response to determining that prioritized services associated with the second network are available, the electronic device transmits a priority message using the second network while communicating the non-prioritized data via the third network. In response to determining the first network is accessible, the electronic device communicates additional non-prioritized data and an additional priority message using the first network.

20 Claims, 4 Drawing Sheets

(56) References Cited

U.S. PATENT DOCUMENTS

2016/0157278 A1* 6/2016 Casati .................. H04W 72/20
370/312
2016/0295386 A1* 10/2016 Faccin .................. H04W 4/029
2016/0366574 A1* 12/2016 Dahan .................... H04W 4/90
2018/0270712 A1 9/2018 Faccin et al.
2019/0082350 A1 3/2019 Kim et al.
2019/0098133 A1* 3/2019 Poikselka ............. H04M 7/006
2019/0266871 A1* 8/2019 Verna .................... H04L 67/306
2019/0306898 A1* 10/2019 Goddeti ................ H04W 76/12
2019/0394814 A1* 12/2019 Bakker .................. H04W 4/90
2020/0262550 A1* 8/2020 Dailey .................. B64U 30/20
2020/0344173 A1 10/2020 Mangla et al.
2021/0144539 A1 5/2021 Edge et al.
2022/0150812 A1* 5/2022 Lin ....................... H04W 60/04
2022/0234225 A1* 7/2022 Glesser .................. H02J 50/10
2022/0264278 A1* 8/2022 Edge .................. H04B 7/18547
2022/0360962 A1* 11/2022 Tseng .................... H04W 8/183
2023/0079636 A1* 3/2023 Edge ..................... H04W 60/04
370/316
2023/0081455 A1* 3/2023 Myneni ................. H04W 72/56
370/329
2023/0209322 A1* 6/2023 Shrivastava ............ H04W 4/90
455/404.2
2023/0308538 A1* 9/2023 Caro ................. H04M 1/72418
2023/0362704 A1* 11/2023 Edge ..................... H04W 24/10
2024/0205792 A1* 6/2024 Shah ................... H04L 65/1045
2025/0016721 A1* 1/2025 Edge ..................... H04W 64/00

* cited by examiner

COMMUNICATION OF PRIORITIZED DATA

CROSS REFERENCE TO RELATED APPLICATIONS

This application claims priority from and the benefit of U.S. Provisional Application Ser. No. 63/244,993, entitled "IMPROVED COMMUNICATION OF PRIORITIZED DATA," filed Sep. 16, 2021, which is hereby incorporated by reference in its entirety for all purposes.

BACKGROUND

The present disclosure relates generally to wireless communication and more specifically to improving communication of prioritized messages when services of certain networks are not available.

A mobile communication device may utilize different networks, such as cellular networks, Wi-Fi networks, satellite networks, and the like, to transmit and/or receive data. In some circumstances, certain services for different networks may not be available for use by the mobile communication device, such as a service provided by a first network when the mobile communication device is outside of a coverage area of the first network. Rather, the mobile communication device may utilize another service of a second network that is available in order to communicate data. Unfortunately, the mobile communication device may not be able to communicate certain data in a reliable or efficient manner using the available other service. As a result, certain operations of the mobile communication device may be undesirably limited.

SUMMARY

In one embodiment, an electronic device includes a first transmitter, a second transmitter, and processing circuitry communicatively coupled to the first transmitter and the second transmitter. The processing circuitry is configured to determine that a first network is inaccessible via the first transmitter, determine that non-prioritized services associated with a second network are unavailable via the first transmitter, communicate with a third network via the second transmitter while the first network is inaccessible and the non-prioritized services associated with the second network are unavailable, receive an indication to transmit a prioritized message, and transmit the prioritized message using the second network via the first transmitter while the first network is inaccessible and the non-prioritized services associated with the second network are unavailable.

In another embodiment, a non-transitory computer-readable medium comprising instructions that, when executed by processing circuitry, are configured to cause the processing circuitry to communicate with a first network in response to determining that the first network is accessible, determine that the first network is inaccessible and non-prioritized services associated with a second network are unavailable, communicate with a third network in response to determining that the first network is inaccessible and the non-prioritized services associated with the second network are unavailable, receive an indication to transmit a prioritized message, and transmit the prioritized message using the second network in response to receiving the indication, determining that the first network is inaccessible, and determining that the non-prioritized services associated with the second network are unavailable.

In yet another embodiment, a method includes determining, via a first transceiver, that a first network is inaccessible, determining, via the first transceiver, that a second network is accessible, determining, via the first transceiver, that non-prioritized services associated with the second network are unavailable while the second is accessible, communicating, via a second transceiver, with a third network in response to determining that the first network is inaccessible, the second network is accessible, and the non-prioritized services associated with the second network are unavailable, and transmitting, via the first transceiver, a prioritized message using the second network in response to determining that the first network is inaccessible and the second network is accessible.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

Figure 1:
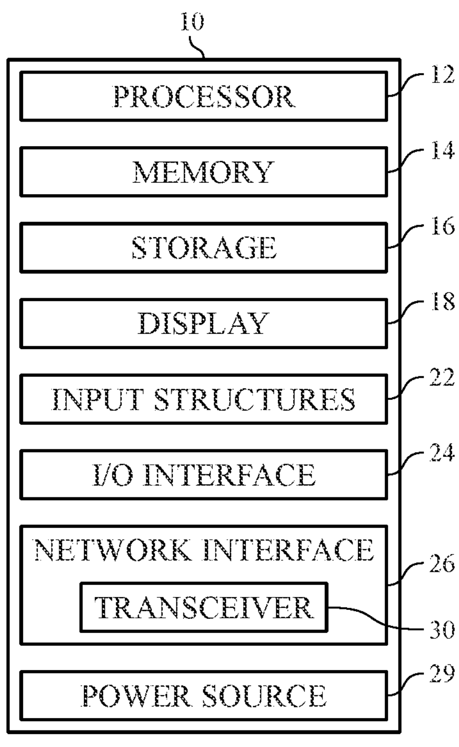
FIG. 1 is a block diagram of an electronic device, according to embodiments of the present disclosure.

This disclosure is directed to improving wireless communications via a mobile communication device when certain services may not be available or accessible to the mobile communication device. By way of example, while a first network established by a first network operator is accessible to the mobile communication device, the mobile communication device may utilize a variety of services provided by the first network operator. For instance, a user utilizing the mobile communication device may have a subscription, an affiliation, a contract, or other association with the first network operator, and the services may be available to the mobile communication device while the mobile communication device remains within a first area of service of the first network operator, and the mobile communication device may be able to communicate non-prioritized data, such as web browser data, and prioritized data, such as emergency messages, via the first network. In some circumstances, such as at certain geographical locations outside of the first area of service and/or during an interrupted operation of the first network operator, the first network may be inaccessible to the mobile communication device. However, a second network established by a second network operator may be accessible. As an example, the mobile communication device may be within a second area of service of the second network operator.

Unfortunately, in some embodiments, certain services provided by the second network operator may not be available for use by the mobile communication device even though the second network is accessible. For example, a user utilizing the mobile communication device may not have a subscription, an affiliation, a contract, or other association with the second network operator. As a result, the mobile communication device may not be able to communicate certain data using the second network. Instead, the mobile communication device may utilize a third network established by a third network operator to communicate data. Indeed, the third network may be accessible to the mobile communication device regardless of the accessibilities of the first network and the second network, and the mobile communication device may be able to communicate data via the third network regardless of the user's association with the first network operator and/or the second network operator.

However, the third network may be a poorer performing communication network relative to the first network and the second network. Thus, communication of data via the third network may be inefficient and/or unreliable. For instance, certain communication operating characteristics (e.g., a transmission power, a receiving power, a bandwidth, availability of the third network due to mobility of the third network operator) of the third network may be limited when compared to the first network or the second network. By way of example, a speed in which data is communicated via the third network may be substantially slower than a speed in which data may typically be communicated using either of the first network or the second network while the respective services associated with the first and second networks are available. As such, it may be difficult in conventional systems to use the mobile communication device to efficiently communicate data, such as prioritized data, while the first network is inaccessible.

Embodiments herein provide various apparatuses and techniques to enable the mobile communication device to communicate prioritized data via the second network while the first network is inaccessible. For example, while the first network is inaccessible and the second network is accessible to the mobile communication device (e.g., the mobile communication device is outside of the first area of service of the first network operator and is within the second area of service of the second network operator), the mobile communication device may communicate non-prioritized data, such as non-prioritized messages, via the third network. However, the mobile communication device may transmit prioritized data, such as a prioritized message, using the second network instead of the third network. As used herein, a non-prioritized message refers to a message (e.g., a Short Message Service (SMS) or "text" communication, an email, a voice call) that may be transmitted to a non-prioritized recipient, such as a personal mobile communication device, and a prioritized message refers to a message that may be transmitted to a prioritized recipient, such as a public-safety answering point (PSAP). Indeed, the mobile communication device may indicate the non-prioritized messages and prioritized messages for transmission based on the intended recipient of a message, such as by addressing the intended recipient, transmitting the message using particular characteristics (e.g., a particular band, a particular channel, a particular frequency) to the intended recipient, and so on.

The characteristics associated with the prioritized data may enable the mobile communication device to communicate the prioritized data using the second network (e.g., enable the second network to relay the prioritized data from the mobile communication device to the intended recipient). As such, the mobile communication device may use the second network to perform certain prioritized services, even though other non-prioritized services provided by the second network operator may not be available to the mobile communication device. For example, the characteristics associated with the non-prioritized data may not enable the mobile communication device to communicate the prioritized data using the second network. Indeed, the mobile communication device may continue to use the third network to perform non-prioritized services (e.g., to transmit and/or receive non-prioritized data). In this manner, the mobile communication device may be able to transmit prioritized data more reliably while the first network is inaccessible.

FIG. 1 is a block diagram of an electronic device or mobile communication device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, the memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol.

The network interface 26 may include, for example, one or more interfaces for a satellite connection (e.g., via a satellite network), a peer-to-peer connection, a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a 3$^{rd}$ generation (3G) cellular network, universal mobile telecommunication system (UMTS), 4$^{th}$ generation (4G) cellular network, long term evolution (LTE®) cellular network, long term evolution license assisted access (LTE-LAA) cellular network, 5th generation (5G) cellular network, and/or New Radio (NR) cellular network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth). The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, UWB network, alternating current (AC) power lines, and so forth. The network interface 26 may, for instance, include a transceiver 30 for communicating data using one of the aforementioned networks. The power source 29 of the electronic device 10 may include any suitable source of power, such as a rechargeable lithium polymer (Li-poly) battery and/or an alternating current (AC) power converter.

Figure 2:
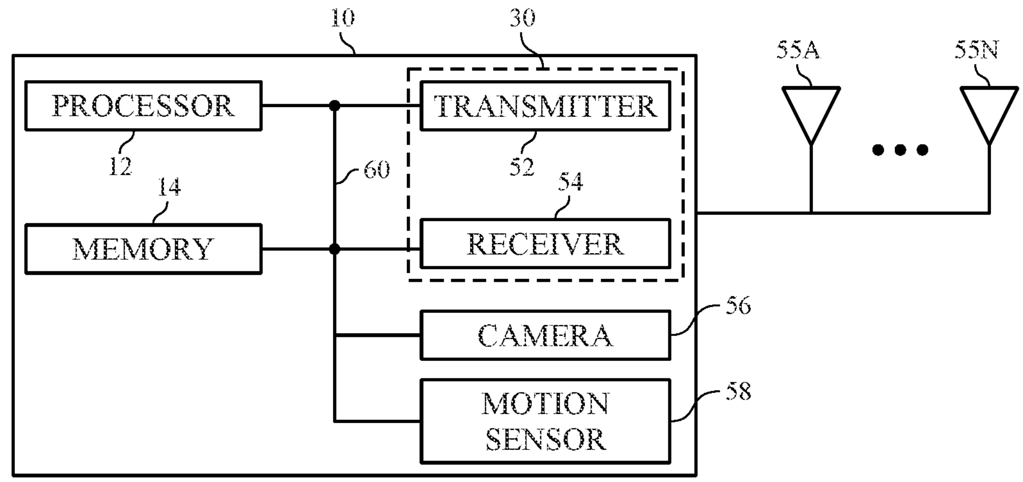
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. For example, the electronic device 10 may include a first transceiver to send and receive messages using a first wireless communication network, a second transceiver to send and receive messages using a second wireless communication network, and a third transceiver to send and receive messages using a third wireless communication network, though any or all of these transceivers may be combined in a single transceiver. In some embodiments, the transmitter 52 and the receiver 54 may transmit and receive information via other wired or wireline systems or means.

The electronic device 10 may also include one or more cameras or image or light sensors (e.g., as part of the input structures 22). The one or more cameras or image or light sensors (collectively referred to as "a camera 56" herein) may capture images or determine amounts of light surrounding the electronic device 10. In some embodiments, the camera 56 may include a front-facing camera (e.g., disposed on a display surface of the electronic device 10 having the display 18) and/or a rear-facing camera (e.g., disposed on a base or back surface, opposite the display surface, of the electronic device 10).

The electronic device 10 may include one or more motion sensors 58 (e.g., as part of the input structures 22). The one or more motion sensors (collectively referred to as "a motion sensor 58" herein) may include an accelerometer, gyroscope, gyrometer, and the like, that detect or facilitate determining an orientation (e.g., including pitch, yaw, roll, and so on) and/or motion of the electronic device 10.

As illustrated, the various components of the electronic device 10 may be coupled together by a bus system 60. The bus system 60 may include a data bus, for example, as well as a power bus, a control signal bus, and a status signal bus, in addition to the data bus. The components of the electronic device 10 may be coupled together or accept or provide inputs to each other using some other mechanism.

As discussed above, the electronic device 10 may communicate data using different networks. For example, the electronic device 10 may communicate data while a first network is accessible. While the first network is inaccessible, the electronic device 10 may communicate data with a different network. For example, a second network and a third network may be accessible to the electronic device 10 while the first network is inaccessible. However, certain services associated with the second network may not be available to the electronic device 10, and the electronic device 10 may not be able to communicate data using the second network. The electronic device 10 may therefore communicate such data with the third network instead. Unfortunately, communication of data via the third network may not be stable, efficient, or reliable. Thus, the operation of the electronic device 10 may be limited or inefficient while the first network is inaccessible.

Embodiments herein provide various apparatuses and techniques to improve communication of data while the first network is inaccessible. As an example, the electronic device 10 may use the second network that is accessible to communicate certain data (e.g., prioritized data) while the first network is inaccessible. Indeed, while some certain services, such as non-prioritized services, associated with the second network may not be available for use by the electronic device 10, other services, such as prioritized services, associated with the second network may be available for use by the electronic device 10. As such, the electronic device 10 may not be able to communicate certain data, such as non-prioritized data, using the second network, but may be able to communicate other data, such as prioritized data, using the second network. That is, the electronic device 10 may use the prioritized services to communicate prioritized data, such as to transmit a prioritized message, using the second network while the second network is accessible to the electronic device 10. In this way, the electronic device 10 may communicate non-prioritized data using the third network and prioritized data using the second network while the first network is inaccessible and the second network is accessible. As a result, the electronic device 10 may communicate prioritized data more reliably and efficiently while the first network is inaccessible.

In some embodiments, the electronic device 10 may communicate the prioritized data via voice communications. By way of example, the electronic device 10 may convert a prioritized message (e.g., in text format) into a voice message, and the electronic device 10 may transmit the voice message in response to a determination that the second network supports or only supports voice communications. Indeed, communication of the prioritized message via voice message may be more reliable than communication of the prioritized message via text in certain embodiments.

Figure 3:
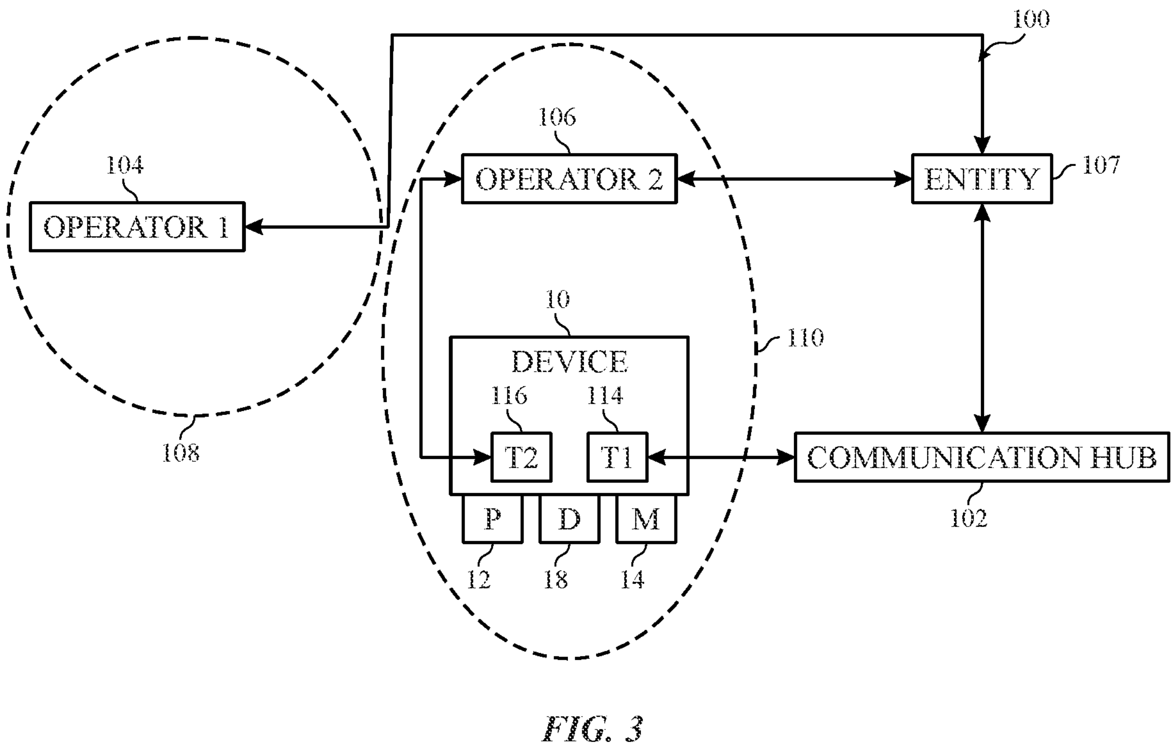
FIG. 3 is a perspective diagram of a communication system including the electronic device of FIG. 1, according to embodiments of the present disclosure.

With the preceding in mind, FIG. 3 is a perspective diagram of a communication system 100 including the electronic device 10, according to embodiments of the present disclosure. The communication system 100 includes a communication hub 102, a first network operator 104, and a second network operator 106. Each of the communication hub 102, the first network operator 104, and the second network operator 106 may establish or be a part of a respective network for communicating data. For instance, the first network operator 104 may establish a first network, the second network operator 106 may establish a second network, and the communication hub 102 may establish a third network. As an example, the communication hub 102, the first network operator 104, and the second network operator 106 may include any combination of base stations, terrestrial stations, satellites (e.g., a low earth orbit satellite, a medium earth orbit satellite, a geosynchronous equatorial orbit satellite, a high earth orbit satellite), cellular networks, a wireless carrier, Wi-Fi networks, satellite networks, and so forth. For example, the electronic device 10, which may be implemented as user equipment, may send a signal to the communication hub 102, which may be implemented as a satellite. In certain embodiments, any of the communication hub 102, the first network operator 104, and the second network operator 106 may be communicatively coupled to another entity 107 (e.g., another electronic device, a ground station, a call center), which may send data to or receive data from the electronic device 10 via the associated network. For instance, the other entity 107 may establish a communication channel with the electronic device 10 via the associated network, receive requests for data from the electronic device 10 via the associated network, and/or send data to the electronic device 10 via the associated network based on the requests.

The first network operator 104 may include a first area of service 108, which may include a range of distances where the first network operator 104 may be capable of receiving and transmitting signals via the first network. Thus, the first network may be accessible to the electronic device 10 while the electronic device 10 is located in the first area of service 108. Indeed, a user may utilize the electronic device 10 to communicate (e.g., send, receive) data via the first network of the first network operator 104 while the electronic device 10 is in the first area of service 108. As an example, the user may have an association (e.g., an account subscription or contract) with the first network operator 104, and a variety of services provided by the first network operator 104 may be available to the electronic device 10 based on the account subscription. For instance, the services available to the electronic device 10 via the first network may include non-prioritized services (e.g., data uploading and/or downloading, video streaming, internet browsing, multimedia messaging service communications, electronic mailing) and prioritized services (e.g., emergency text messaging, emergency voice calling).

The second network operator 106 may include a second area of service 110, which may include a range of distances where the second network operator 106 may be capable of receiving and transmitting signals via the second network. As such, the second network may be accessible to the electronic device 10 while the electronic device 10 is located in the second area of service 110. However, the user may not have an association with the second network operator 106.

In some embodiments, a variety of services provided by the second network operator 106 may still be available to the electronic device 10 even though the user is not associated with the second network operator 106. For example, the first network operator 104 and the second network operator 106 may have a service agreement (e.g., a roaming agreement). The services provided by the second network operator 106 may also be available for any user associated with the first network operator 104 based on the service agreement, and the services provided by the first network operator 104 may further be available for any user associated with the second network operator 106 based on the service agreement. Alternatively, in some circumstances, such as when there is no service agreement between the first network operator 104 and the second network operator 106, a limited number or amount of services provided by the second network operator 106 may be available to a user that is not associated with the second network operator 106. For instance, non-prioritized services provided by the second network operator 106 may not be available to the electronic device 10 even though the second network is accessible by the electronic device 10.

The electronic device 10 may also be able to communicate data with the communication hub 102 using the third network. In some embodiments, while each of the first network and the second network may be inaccessible to the electronic device 10 (e.g., the electronic device 10 is outside of the first area of service 108 and the second area of service 110), the electronic device 10 may communicate with the communication hub 102. That is, the electronic device 10 may communicate via the communication hub 102 when data cannot be communicated via network operators 104, 106. Indeed, the third network associated with the communication hub 102 may be accessible to the electronic device 10 at multiple different geographical locations, even when other networks may be inaccessible to the electronic device 10.

To this end, the electronic device 10 may include a first transceiver 114, which may communicate data with the communication hub 102, and a second transceiver 116, which may communicate data with one of the network operators 104, 106 (e.g., based on accessibility of the first network or the second network). In an example, while the first network is accessible to the electronic device 10 (e.g., to the second transceiver 116), the second transceiver 116 may communicate data with the first network operator 104. In another example, while the second network is accessible to the electronic device 10 (e.g., to the second transceiver 116), such as when the first network operator 104 and the second network operator 106 have a service agreement and the services provided by the second network operator 106 are therefore available to the electronic device 10, the second transceiver 116 may communicate data with the second network operator 106. In yet another example, while neither the first network nor the second network is accessible to the electronic device 10 (e.g., to the second transceiver 116), such as when the first network operator 104 and the second network operator 106 do not have a service agreement and certain services provided by the second network operator 106 therefore are not available to the electronic device 10, the first transceiver 114 may communicate data with the communication hub 102.

Accordingly, the first transceiver 114 may operate to communicate data via the third network when the second transceiver 116 has limited operation for communicating data (e.g., via the first and/or second networks). Although the illustrated electronic device 10 includes multiple transceivers 114, 116 (e.g., multiple instances of the transceiver 30) for communicating data via different networks, the electronic device 10 may additionally or alternatively include separate transmitters and receivers (e.g., the transmitter 52 and the receiver 54 not being combined into a transceiver) for transmitting data to and receiving data from, respectively, different networks.

In some embodiments, other networks may be accessible to the electronic device 10. Thus, the electronic device 10 may communicate data via a network other than the first network, the second network, or the third network. As an example, the electronic device 10 may communicate via another network even though at least one of the first, second, or third networks is accessible. Indeed, one of the transceivers 114, 116 or an additional transceiver of the electronic device 10 may operate to communicate data via another network.

Certain communication operating characteristics (e.g., a transmission power, a receiving power, a bandwidth, a link budget, an uplink rate, a downlink rate, an availability of a network) of the third network associated with the communication hub 102 may be limited or reduced when compared to that of the first network or the second network. For example, the link budget or the receiving signal strength associated with data communication via the communication hub 102 (e.g., the receiving power of the first transceiver 114 with respect to a transmitting power of the communication hub 102, the receiving power of the communication hub 102 with respect to a transmitting power of the first transceiver 114) may be substantially lower or more limited than the link budget associated with data communication with the network operators 104, 106 (e.g., the receiving power of the second transceiver 116 with respect to a transmitting power of one of the network operators 104, 106, the receiving power of one of the network operators 104, 106 with respect to a transmitting power of the second transceiver 116). Thus, the third network may be a poorer performing network with respect to the first network and the second network, and communicating data via the first or second networks may be more stable, efficient, and/or reliable than communicating data via the third network. For at least these reasons, when at least one of the first or second networks is accessible, it may be more desirable for the electronic device 10 to communicate using the accessible first or second network instead of using the third network.

In the illustrated embodiment, the electronic device 10 is located within the second area of service 110 associated with the second network operator 106 and outside of the first area of service 108 associated with the first network operator 104. As such, the first network may be inaccessible to the electronic device 10, and the second network may be accessible to the electronic device 10. For discussion purposes, the first network operator 104 and the second network operator 106 do not have a service agreement in the illustrated communication system 100. Therefore, certain (e.g., non-prioritized) services provided by the second network operator 106 and associated with the second network are not available to the electronic device 10 even though the second network is accessible to the electronic device 10. As such, the electronic device 10 may not be able to communicate certain data (e.g., non-prioritized data) via the second network. Instead, the electronic device 10 may communicate such data via the third network. Indeed, the electronic device 10 may be able to communicate data with the communication hub 102 regardless of the user's association with the first network operator 104 and/or the second network operator 106.

However, it may be desirable for the electronic device 10 to communicate prioritized data via the second network rather than the third network because of the better communication performance (e.g., higher link budget) associated with communication via the second network. For instance, the third network may not enable transmission of prioritized messages to a prioritized recipient within a desirable or target block of time or with sufficient quality. That is, there may be an undesirable delay associated with transmission of the prioritized messages from the electronic device 10 and receipt of the prioritized messages by the prioritized recipient, or undesirable noise in delivery of the prioritized messages (e.g., such that the prioritized messages may not be complete or deciphered). Thus, the electronic device 10 may communicate prioritized data via the second network to expedite transmission or increase quality (e.g., signal-to-noise ratio) of the prioritized messages. For example, in response to a determination that the first network is inaccessible and the second network is accessible, the electronic device 10 may communicate prioritized data via the second network even though communication of other data (e.g., via non-prioritized services associated with the second network) is not available. Accordingly, in such circumstances, the electronic device 10 may communicate prioritized data via the second network and other data (e.g., non-prioritized data) via the third network.

In some embodiments, the electronic device 10 may generate or create the prioritized messages based on an indication (e.g., a user input provided via the input structure 22 and/or the display 18). In certain embodiments, the prioritized messages may include a text message (e.g., an SMS message). In additional or alternative embodiments, the prioritized messages may include voice messages. By way of example, in response to a determination that the second network and/or the prioritized recipient supports or only supports voice message communication, the electronic device 10 may convert text messages (e.g., text messages initially created based on input by the user) into a voice message, such as via text-to-speech processing (e.g., speech synthesis), and may transmit the converted voice message to the prioritized recipient. In further embodiments, in response to a determination that the second network and/or the prioritized recipient supports or only supports voice communications, the electronic device 10 may present a notification (e.g., via the display 18) to indicate that prioritized voice services are available. For example, the notification may inform the user that prioritized services, such as emergency calls to the prioritized recipient, are available via the second network even though other services associated with the second network may not be available. In some embodiments, the notification may include a feature (e.g., an icon, a button) that is selectable or actuatable by the user and, upon selection of the feature, the electronic device 10 may place an emergency call (e.g., a telephone call) with the prioritized recipient to facilitate communication between the user and the prioritized recipient.

The electronic device 10 may receive the indication of a priority message to be transmitted, generate the prioritized message based on the indication, and transmit the prioritized message based on an accessible network. In one example, the electronic device 10 may determine that the first network is accessible and may therefore transmit the prioritized message via the first network. In another example, the electronic device 10 may determine that the first network is inaccessible and that the second network is accessible, and, in response, the electronic device 10 may transmit the prioritized message via the second network. In a further example, the electronic device 10 may determine that each of the first network and the second network is inaccessible, and, in response, the electronic device 10 may transmit the prioritized message via the third network.

As described herein, the lower link budget associated with communication via the third network may delay transmission of prioritized messages via the third network (e.g., when compared to the first network or the second network). For example, upon receipt of an indication (e.g., a user input) to transmit a set of prioritized messages while the first network and the second network are inaccessible, the electronic device 10 may transmit a first subset of the prioritized messages via the third network, and a second subset of the prioritized messages may be queued or pending while the electronic device 10 attempts to transmit a remainder of the set of prioritized messages via the third network. In one or more embodiments, when the electronic device 10 comes into range of an area of service 108, 110 of the first network or the second network, such that the first network or the second network becomes newly accessible, the electronic device 10 may attempt to transmit the second subset of prioritized messages (e.g., queued or pending messages) via the newly accessible network instead of via the third network. Thus, the electronic device 10 may be able to switch the network being used to transmit the prioritized messages in order to utilize a more reliable or stable network to transmit pending prioritized messages. In this manner, the electronic device 10 may transmit a portion of the set of prioritized messages via one network (e.g., the third network) and another portion of the set of prioritized messages via a different network (e.g., the second network).

In some embodiments, the electronic device 10 may enable communication of prioritized data based on an indication (e.g., a user input received the input structure 22 or the display 18). As an example, the indication may indicate that the electronic device 10 may automatically communicate prioritized data via the second network. As such, each time the electronic device 10 determines that the first network is inaccessible and the second network is accessible, the electronic device 10 may communicate prioritized data via the second network without prompting for further user input. As another example, each time the electronic device 10 determines that the first network is inaccessible and the second network is accessible (e.g., the prioritized services associated with the second network are available), the electronic device 10 may present a notification that the second network is accessible to transmit the prioritized data, and the notification may prompt for user input (e.g., via the display 18) regarding whether the electronic device 10 is to use the second network to communicate the prioritized data. The electronic device 10 may receive first user input confirming that the electronic device 10 is to use the second network to communicate prioritized data in response to the notification, and the electronic device 10 may proceed to communicate prioritized data via the second network in response to receiving the first user input. However, the electronic device 10 may receive second user input that indicates the electronic device 10 to not to use the second network to communicate prioritized data, and the electronic device 10 may block communication of the prioritized data via the second network in response to receiving second user input.

The electronic device 10 (e.g., the second transceiver 116) may also request for receipt of certain information via the second network in response to determining that the second network is accessible, even though the first network is inaccessible and the non-prioritized services associated with the second network are unavailable. By way of example, the electronic device 10 (e.g., the second transceiver 116) may request for content delivery network (CDN) information to be transmitted by the second network operator 106 to the electronic device 10 via the second network, assuming such a request is a prioritized service. The electronic device 10 may utilize the CDN information to initiate communication with the communication hub 102. For instance, the CDN information may include an identifier, a frequency channel, allowed areas of operation, and so forth, that may be used to determine availability of the communication hub 102 for communicating with the electronic device 10 (e.g., based on the geographic location of the electronic device 10 and/or a location of the communication hub 102). Thus, it may be desirable for the electronic device 10 to periodically request updated CDN information from the second network while the second network is accessible to enable the electronic device 10 to communicate with the communication hub 102 in circumstances when the first network and the second network are inaccessible (e.g., for non-prioritized services).

Each of FIGS. 4 and 5 described below illustrates a respective method for communicating data. Any suitable device (e.g., a controller) that may control components of the electronic device 10, such as the processor 12, may perform the methods. In some embodiments, each of the methods may be implemented by executing instructions stored in a tangible, non-transitory, computer-readable medium, such as the memory 14 or storage 16, using the processor 12. For example, the methods may be performed at least in part by one or more software components, such as an operating system of the electronic device 10, one or more software applications of the electronic device 10, and the like. While each of the methods is described using steps in a specific sequence, additional steps may be performed, the described steps may be performed in different sequences than the sequence illustrated, and certain described steps may be skipped or not performed altogether. Further still, the steps of any of the respective methods may be performed in parallel with one another, such as at the same time, and/or in response to one another.

Figure 4:
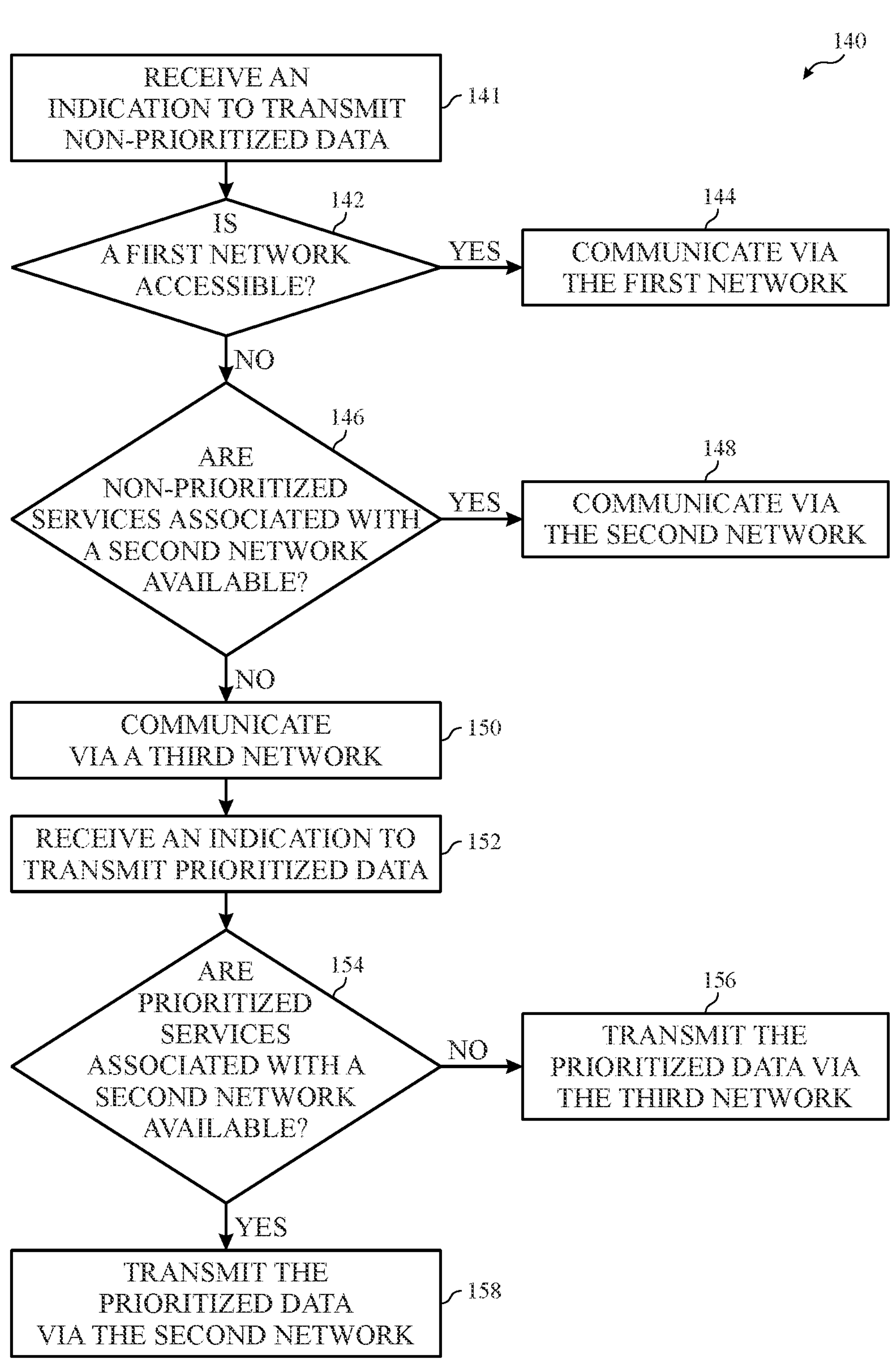
FIG. 4 is a flowchart of a method for communicating via the electronic device of FIG. 1 based on accessibility of different networks, according to embodiments of the present disclosure.

FIG. 4 is a flowchart of an embodiment of a method 140 for communicating data via the electronic device 10 based on accessibility of different networks, according to embodiments of the present disclosure. At block 141, the processor 12 may receive an indication to transmit non-prioritized data. The non-prioritized data may include, for example, data to be uploaded and/or downloaded, video streaming data, internet browsing data, multimedia messaging service communication data, emails). At block 142, the processor 12 may determine whether the first network established by the first network operator 104 is accessible via the second transceiver 116. For example, the processor 12 may determine whether the second transceiver 116 is able to transmit and/or receive the non-prioritized data using the first network. At block 144, in response to a determination that the first network is accessible, the processor 12 may cause the second transceiver 116 to communicate with the first network. By way of example, the processor 12 may cause the second transceiver 116 to transmit and/or receive the non-prioritized data via the first network. It should be noted that in cases in which the non-prioritized data is instead prioritized data, the processor 12 may cause the second transceiver 116 to transmit the prioritized data via the first network (e.g., based on a user input) while the first network is accessible.

At block 146, the processor 12 may determine that the first network is inaccessible (e.g., the electronic device 10 is outside of the first area of service 108) and may therefore determine whether non-prioritized services associated with the second network established by the second network operator 106 are available via the second transceiver 116. For instance, the processor 12 may determine whether the second transceiver 116 is able to transmit and/or receive the non-prioritized data using the second network. At block 148, in response to a determination that the non-prioritized services associated with the second network are available, the processor 12 may cause the second transceiver 116 to communicate with the second network. As an example, the first network operator 104 and the second network operator 106 may have a service agreement. Thus, even though the user of the electronic device 10 may not be associated with the second network operator 106, the non-prioritized services associated with the second network may be available to the processor 12 via the service agreement. As a result, the processor 12 may cause the electronic device 10 to utilize non-prioritized services provided by the second network operator 106, such as to cause the second transceiver 116 to transmit and/or receive the non-prioritized data via the second network. In cases in which the non-prioritized data is instead prioritized data, the processor 12 may cause the electronic device 10 to utilize prioritized service provided by the second network operator 106, such as to cause the second transceiver 116 to transmit and/or receive prioritized data via the second network.

At block 150, in response to a determination that the non-prioritized services associated with the second network are unavailable, the processor 12 may cause the first transceiver 114 to communicate with the third network established by the communication hub 102. As an example, the processor 12 may determine that the second network is inaccessible via the second transceiver 116. That is, the processor 12 may determine that the second transceiver 116 is unable to transmit and/or receive data using the second network. For instance, the electronic device 10 may be outside of the second area of service 110. As another example, the second network may be accessible, but there may not be a service agreement between the first network operator 104 and the second network operator 106. As a result, the processor 12 may not be able to cause the second transceiver 116 to use the second network to transmit and/or receive the non-prioritized data. Rather, the processor 12 may cause the first transceiver 114 to use the third network to transmit and/or receive the non-prioritized data.

At block 152, the processor 12 may receive an indication to transmit prioritized data. The prioritized data may include, for example, a prioritized message (e.g., a text message). At block 154, in response to receiving the indication to transmit the prioritized data, the processor 12 may determine whether prioritized services (e.g., emergency services) associated with the second network are available via the second transceiver 116. For instance, the processor 12 may determine whether the second transceiver 116 is able to transmit and/or received prioritized data using the second network.

At block 156, the processor 12 may determine that the prioritized services associated with the second network are unavailable via the second transceiver 116, and the processor 12 may cause the first transceiver 114 to transmit the prioritized data via the third network in response. By way of example, the processor 12 may determine that the prioritized services associated with the second network are unavailable based on the second network being inaccessible.

At block 158, the processor 12 may determine that the prioritized services associated with the second network are available via the second transceiver 116, and the processor 12 may cause the second transceiver 116 to transmit the prioritized data via the second network in response by using the prioritized services associated with the second network. In some embodiments, the processor 12 may prompt the user to indicate whether to transmit the prioritized data via the second network, and the processor 12 may cause the second transceiver 116 to transmit the prioritized data via the second network in response to receiving an indication (e.g., user input) confirming that the electronic device 10 is to transmit the prioritized data via the second network. However, the processor 12 may cause the first transceiver 114 to transmit the prioritized data via the third network in response to receiving an indication (e.g., user input) to block transmission of the prioritized data using the second network (e.g., that the electronic device 10 is not to transmit the prioritized data via the second network), even though the prioritized services associated with the second network may be available via the second transceiver 116. In any case, the method 140 may enable the electronic device 10 to transmit prioritized data reliably using the second network when the first network is not accessible.

It should be noted that while the prioritized services associated with the second network are available, the non-prioritized services associated with the second network may remain unavailable. Therefore, the processor 12 may continue to cause the first transceiver 114 to transmit the non-prioritized data via the third network while the first network is inaccessible, the second network is accessible, and the non-prioritized services associated with the second network are unavailable. It should also be noted that the processor 12 may readily switch the manner in which data is to be communicated. For example, at block 156, attempting to transmit the prioritized data via the third network may result in queued or pending prioritized data that the first transceiver 114 has not yet transmitted via the third network. While there are queued prioritized data to be transmitted (e.g., a remaining subset of prioritized data after successful transmission of an initial subset of the prioritized data via the third network), the processor 12 may determine that the prioritized services associated with the second network have become available (e.g., based on the second network becoming accessible). As a result, the processor 12 may cause the second transceiver 116 to use the second network (e.g., instead of the first transceiver 114 to use the first network) to transmit the queued prioritized data. In additional or alternative embodiments, at any time in which the processor 12 determines that the first network has become accessible, the processor 12 may cause the second transceiver 116 to transmit the prioritized data via the first network. Indeed, the processor 12 may continually repeat performance of any of the aforementioned steps of the method 140 to determine how data is to be communicated, such as to transmit subsequent prioritized data, based on an accessible network.

Figure 5:
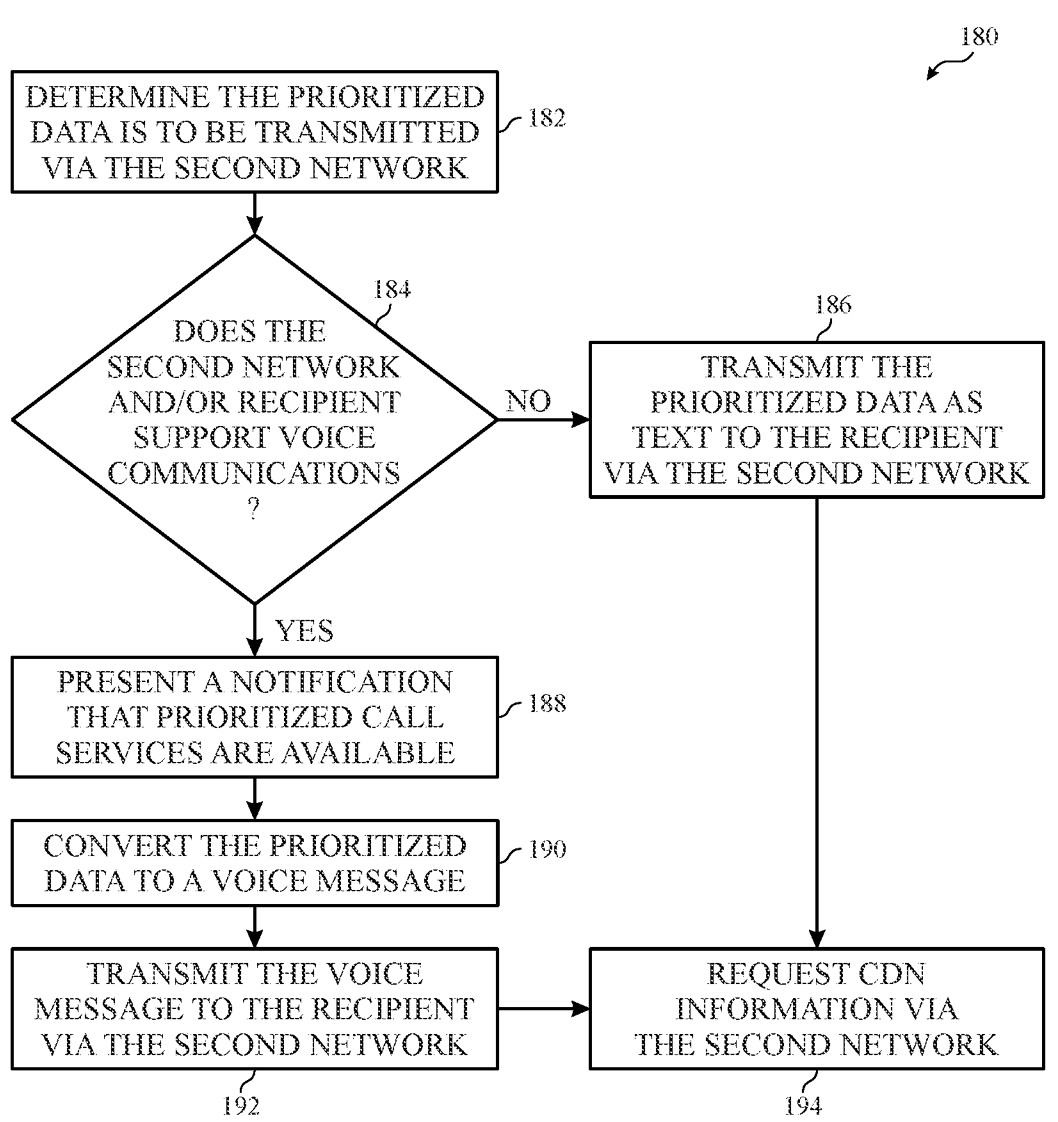
FIG. 5 is a flowchart of a method for communicating prioritized data via the electronic device of FIG. 1 using an accessible network, according to embodiments of the present disclosure.

FIG. 5 is a flowchart of an embodiment of a method 180 for communicating prioritized data via the electronic device 10 using the second network, according to embodiments of the present disclosure. At block 182, the processor 12 may determine that the electronic device 10 is to transmit the prioritized data to a prioritized recipient (e.g., a PSAP) via the second network. By way of example, the processor 12 may receive an indication to transmit the prioritized data via a user input, and the processor 12 may determine that the electronic device 10 is to transmit the prioritized data via the second network in response to a determination that the first network is inaccessible via the second transceiver 116 and the prioritized services associated with the second network are available via the second transceiver 116. Such prioritized data may include queued or pending prioritized data that the electronic device 10 has not yet transmitted (e.g., via the third network), and the processor 12 may determine that the queued prioritized data is to be transmitted via the second network in response to the second network being accessible via the second transceiver 116 (e.g., the priority services associated with the second network being available). In certain embodiments, the processor 12 may also determine that the electronic device 10 is to transmit the prioritized data via the second network in response to an indication (e.g., user input) indicating or confirming as such.

At block 184, in response to determining that the electronic device 10 is to transmit the prioritized data to the prioritized recipient via the second network, the processor 12 may determine whether the second network and/or the prioritized recipient support or only support voice communications. At block 186, in response to determining that the second network and/or the prioritized recipient do not support voice communications, the processor 12 may cause the second transceiver 116 to transmit the prioritized data as a text message to the prioritized recipient via the second network. In some embodiments, the processor 12 may tag the prioritized data (e.g., as an emergency) and transmit the tagged prioritized data to the prioritized recipient. Thus, the prioritized recipient may identify the prioritized data and view the prioritized data more readily.

At block 188, in response to determining that the second network and/or the prioritized recipient support or only support voice communications, the processor 12 may present a notification that prioritized call services are available to inform the user of the electronic device 10 that the user may communicate via the prioritized call services. That is, in some cases, the processor 12 may present the notification when the processor 12 determines that the second network and/or the prioritized recipient is capable of voice communication. In other cases, the processor 12 may present the notification when the processor 12 determines that the only prioritized service provided by the second network and/or the prioritized recipient is voice communication (and not text or other data communication). In some embodiments, the processor 12 may determine that the user has selected or actuated a feature of the electronic device 10 in response to presentation of the notification, and the processor 12 may place the electronic device 10 in a call with the prioritized recipient in response. Thus, the processor 12 may readily enable placement of the electronic device 10 in a call with the prioritized recipient in response to determining that the second network and/or the prioritized recipient support prioritized call services.

At block 190, in response to determining that the second network and/or the prioritized recipient support or only support voice communications, the processor 12 may convert the prioritized data to be transmitted via the second network into a voice message. For example, the processor 12 may use machine learning, text analysis, natural language processing, linguistic analysis, waveform generation, and so forth to convert text indicated by the prioritized data into a voice message generated using artificial speech. At block 192, the processor 12 may cause the second transceiver 116 to transmit the voice message to the prioritized recipient.

At block 194, regardless of whether voice communications are supported, the processor 12 may cause the second transceiver 116 to request CDN information via the second network while the first network is inaccessible and the second network is accessible. As an example, the processor 12 may cause the second transceiver 116 to request the CDN information after the processor 12 has caused the second transceiver 116 to transmit the prioritized data as a text message for embodiments in which the second network and/or the prioritized recipient do not support voice communications. As another example, the processor 12 may cause the second transceiver 116 to request the CDN information after the processor 12 has caused the second transceiver 116 to transmit the prioritized data as a voice message for embodiments in which the second network and/or the prioritized recipient support or only support voice communications. The processor 12 may then receive the CDN information via the second transceiver 116 for usage to communicate with the communication hub 102. For instance, the processor 12 may store the CDN information and retrieve the CDN information in response to a determination that the electronic device 10 is to communicate with the communication hub 102 (e.g., based on the first network and the second network being inaccessible). Thus, the electronic device 10 may more readily communicate with the communication hub 102. Indeed, the method 180 may enable the electronic device 10 to improve communication of data (e.g., using the first network, the second network, and/or the third network) via the second network.

Embodiments of the present disclosure are directed to operating a mobile communicating device to communicate (e.g., transmit, receive) data. In response to determining that a first network is accessible to the mobile communicating device, the mobile communicating device may communicate non-prioritized and prioritized data via the first network. In response to determining that the first network is inaccessible, the mobile communicating device may determine whether a second network is accessible. The mobile communicating device may communicate prioritized data via the second network in response to the second network being accessible. Indeed, the mobile communicating device may communicate prioritized data via the second network regardless of whether non-prioritized services associated with the second network are available to communicate non-prioritized data. For example, the mobile communicating device may communicate non-prioritized data via a third network while the first network is inaccessible, and the mobile communicating device may communicate prioritized data via the second network while communicating the non-prioritized data via the third network. As such, the mobile communicating device may utilize a relatively more reliable and/or efficient network to communicate the prioritized data, thereby improving communication of the prioritized data.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An electronic device, comprising:

a first transmitter;

a second transmitter; and processing circuitry communicatively coupled to the first transmitter and the second transmitter, and configured to receive a first indication indicative that a first network is inaccessible via the first transmitter, receive a second indication indicative that non-prioritized services associated with a second network are unavailable via the first transmitter, communicate with a satellite network via the second transmitter while the first network is inaccessible and the non-prioritized services associated with the second network are unavailable, receive a third indication to transmit a prioritized message, transmit the prioritized message using the second network via the first transmitter while the first network is inaccessible, the non-prioritized services associated with the second network are unavailable, and the non-prioritized services associated with the satellite network are available, and transmit a non-prioritized message using the satellite network via the second transmitter while the first network is inaccessible, the non-prioritized services associated with the second network are unavailable, and the non-prioritized services associated with the satellite network are available.

2. The electronic device of claim 1, wherein the processing circuitry is configured to receive a fourth indication indicative that the second network is inaccessible via the first transmitter and transmit an additional prioritized message using the satellite network via the second transmitter while the first network and the second network are inaccessible.

3. The electronic device of claim 1, wherein the processing circuitry is configured to receive a fourth indication indicative that the first network is accessible via the first transmitter and transmit an additional prioritized message using the first network via the first transmitter while the first network is accessible.

4. The electronic device of claim 1, wherein the processing circuitry is configured to receive a fourth indication indicative that the non-prioritized services associated with the second network are available via the first transmitter and communicate with the second network via the first transmitter while the first network is inaccessible and the non-prioritized services associated with the second network are available.

5. The electronic device of claim 1, wherein the processing circuitry is configured to receive a fourth indication indicative that the second network supports voice communication, convert the prioritized message to a voice message in response to determining that the second network supports voice communication, and transmit the voice message using the second network via the first transmitter.

6. The electronic device of claim 5, wherein the processing circuitry is configured to present a notification that prioritized call services are available in response to determining that the second network supports voice communication, and initiate a call with the prioritized call services based on feedback from the notification.

7. The electronic device of claim 1, wherein the processing circuitry is configured to receive a fourth indication to transmit a plurality of prioritized messages, transmit a first prioritized message of the plurality of prioritized messages using the satellite network via the second transmitter while the first network and the second network are inaccessible, receive a fifth indication indicative that the second network has become accessible via the first transmitter after transmitting the first prioritized message, and transmit a second prioritized message of the plurality of prioritized messages using the second network via the first transmitter while the first network is inaccessible and the second network is accessible.

8. The electronic device of claim 1, wherein the processing circuitry is configured to receive a fourth indication to block transmission of the prioritized message using the second network and transmit the prioritized message using the satellite network via the second transmitter in response to receiving the fourth indication.

9. The electronic device of claim 1, wherein the processing circuitry is configured to transmit, via the satellite network, a first subset of prioritized messages, and queue a second subset of the prioritized messages during transmission of the first subset of prioritized messages.

10. A non-transitory computer-readable medium comprising instructions that, when executed by processing circuitry, are configured to cause the processing circuitry to communicate with a first network in response to determining that the first network is accessible, receive a first indication indicative that the first network is inaccessible and non-prioritized services associated with a second network are unavailable, communicate with a satellite network in response to determining that the first network is inaccessible and the non-prioritized services associated with the second network are unavailable, receive a second indication to transmit a prioritized message, transmit the prioritized message using the second network based on the second indication while the first network is inaccessible, the non-prioritized services associated with the second network are unavailable, and the non-prioritized services associated with the satellite network are available, and transmit a non-prioritized message using the satellite network the first network is inaccessible, the non-prioritized services associated with the second network are unavailable, and the non-prioritized services associated with the satellite network are available.

11. The non-transitory computer-readable medium of claim 10, wherein the instructions, when executed by the processing circuitry, are configured to cause the processing circuitry to communicate with the second network in response to determining that the non-prioritized services associated with the second network are available.

12. The non-transitory computer-readable medium of claim 10, wherein the instructions, when executed by the processing circuitry, are configured to cause the processing circuitry to present a notification indicative that the second network is accessible to transmit the prioritized message in response to determining that the first network is inaccessible and the second network is accessible, receive a third indication to transmit the prioritized message using the second network in response to presenting the notification, and transmit the prioritized message using the second network in response to receiving the third indication.

13. The non-transitory computer-readable medium of claim 10, wherein the instructions, when executed by the processing circuitry, are configured to cause the processing circuitry to tag the prioritized message as a tagged prioritized message and transmit the tagged prioritized message using the second network in response to determining that the first network is inaccessible and the non-prioritized services associated with the second network are unavailable.

14. The non-transitory computer-readable medium of claim 10, wherein the instructions, when executed by the processing circuitry, are configured to cause the processing circuitry to receive a third indication to transmit a plurality of prioritized messages, transmit a first prioritized message of the plurality of prioritized messages using the satellite network in response to determining that the first network is inaccessible and prioritized services associated with the second network are unavailable, receive a fourth indication indicative that the prioritized services associated with the second network have become available after transmitting the first prioritized message, receive a fifth indication indicative that the second network supports voice communication, convert a second prioritized message of the plurality of prioritized messages to a voice message in response to determining that the prioritized services associated with the second network are available and the second network supports voice communication, and transmit the voice message using the second network.

15. The non-transitory computer-readable medium of claim 10, wherein the instructions, when executed by the processing circuitry, are configured to cause the processing circuitry to transmit the prioritized message using prioritized services associated with the second network in response to determining that the first network is inaccessible and the non-prioritized services associated with the second network are unavailable.

16. The non-transitory computer-readable medium of claim 15, wherein the prioritized services associated with the second network comprise emergency services.

17. A method, comprising:

receive a first indication, via a first transceiver, that a first network is inaccessible;

receive a second indication, via the first transceiver, that a second network is accessible;

receive a third indication, via the first transceiver, that non-prioritized services associated with the second network are unavailable while the second network is accessible;

communicating, via a second transceiver, with a satellite network in response to determining that the first network is inaccessible, the second network is accessible, and the non-prioritized services associated with the second network are unavailable; and transmitting, via the second transceiver, non-prioritized data with the satellite network while transmitting, via the first transceiver, a prioritized message using the second network based on the first network being inaccessible, the second network being accessible, and the non-prioritized services associated with the second network being unavailable.

18. The method of claim 17, comprising requesting, via the first transceiver, content delivery network information from the second network while the first network is inaccessible and the second network is accessible.

19. The method of claim 17, comprising determining, via the first transceiver, that prioritized services associated with the second network are available while the second network is accessible and transmitting, via the first transceiver, the prioritized message using the second network in response to determining that the first network is inaccessible and the prioritized services associated with the second network are available.

20. The method of claim 19, comprising transmitting, via the second transceiver, the prioritized message using the satellite network in response to determining that the first network is inaccessible and the prioritized services associated with the second network are unavailable.

* * * * *